Oct. 22, 1946.　　　T. E. V. HUNT　　　2,409,936
TOOLMAKER'S ANGLE BLOCK
Filed Sept. 12, 1944　　　3 Sheets-Sheet 1

Inventor:—
Thomas E. V. Hunt
by his Attorneys
Howson & Howson

Oct. 22, 1946.    T. E. V. HUNT    2,409,936
TOOLMAKER'S ANGLE BLOCK
Filed Sept. 12, 1944    3 Sheets-Sheet 2

Inventor:—
Thomas E.V. Hunt
by his Attorneys
Howson & Howson

Oct. 22, 1946.   T. E. V. HUNT   2,409,936
TOOLMAKER'S ANGLE BLOCK
Filed Sept. 12, 1944   3 Sheets-Sheet 3
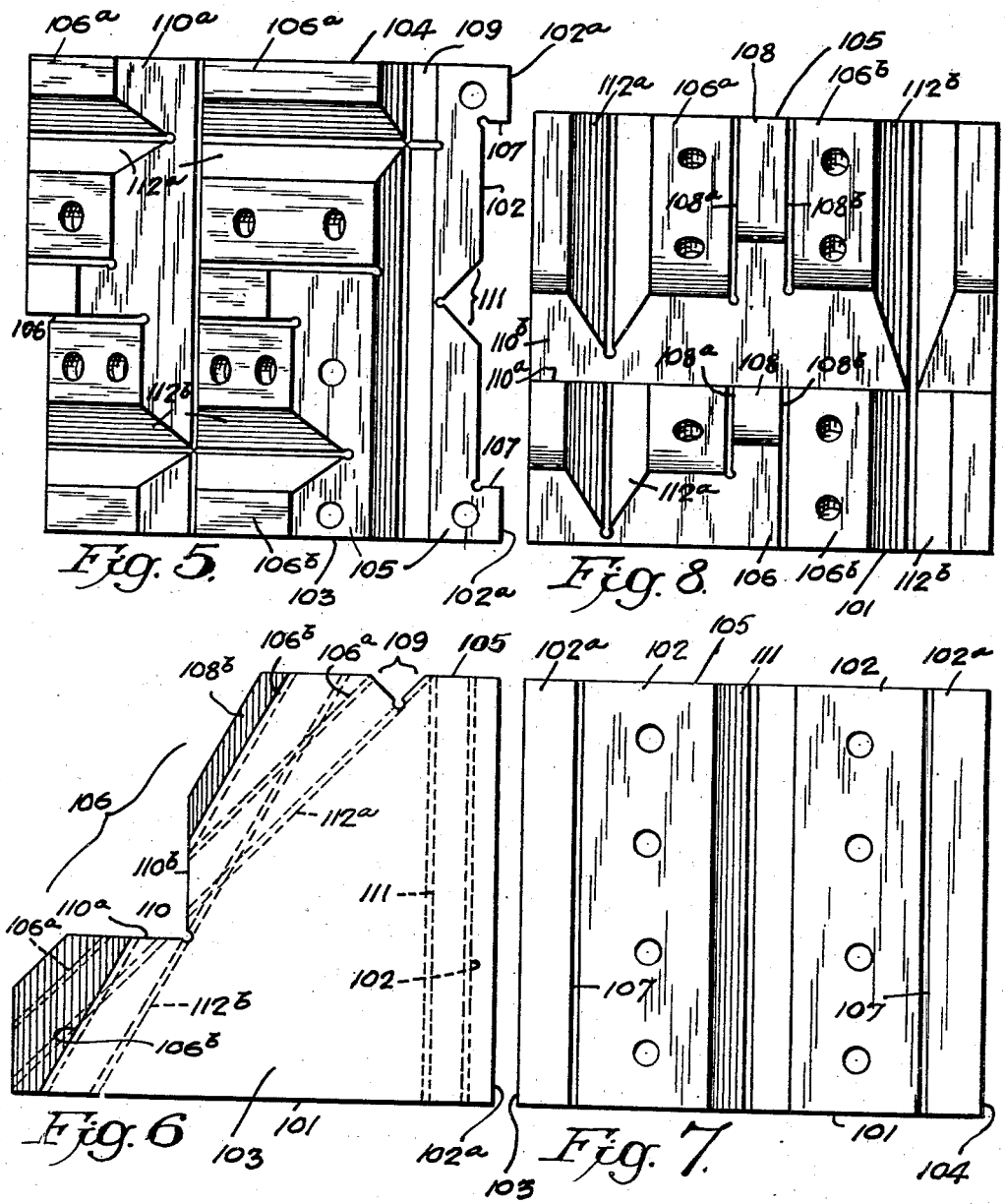

Patented Oct. 22, 1946

2,409,936

UNITED STATES PATENT OFFICE 2,409,936

TOOLMAKER'S ANGLE BLOCK

Thomas E. V. Hunt, Norristown, Pa.

Application September 12, 1944, Serial No. 553,790

9 Claims. (Cl. 90—59)

The invention relates to an improvement on the usual toolmaker's so-called conventional angle iron, which normally comprises a true horizontal base surface and a single true vertical surface at 90° to the base surface, for holding various kinds of work pieces to be drilled, ground, planed, or otherwise machined, so that the machinings will be true right angles to each other, suitable clamps being provided to hold the work to the angle iron and the angle iron now to the bed of the machine tool on which the angle iron is being used.

The object of the present invention is to produce a machinist's tool of greater utility than the above-noted time honored toolmaker's angle iron, by providing a solid block of hardened steel, for example, with a plurality of flat surfaces which are mechanically true, per se, and which bear true predetermined angular relationship to each other, whereby the block may be depended upon for accuracy in clamping flat, round, rectangular or other shaped pieces of work in definite relationship to the path of movement rotation etc. of a tool head or spindle etc. and to the stationary or movable bed plates of any of a large number of machine tools, such as drill presses, shapers, planers, grinders, slotters, milling machines, etc.

Figure 1:
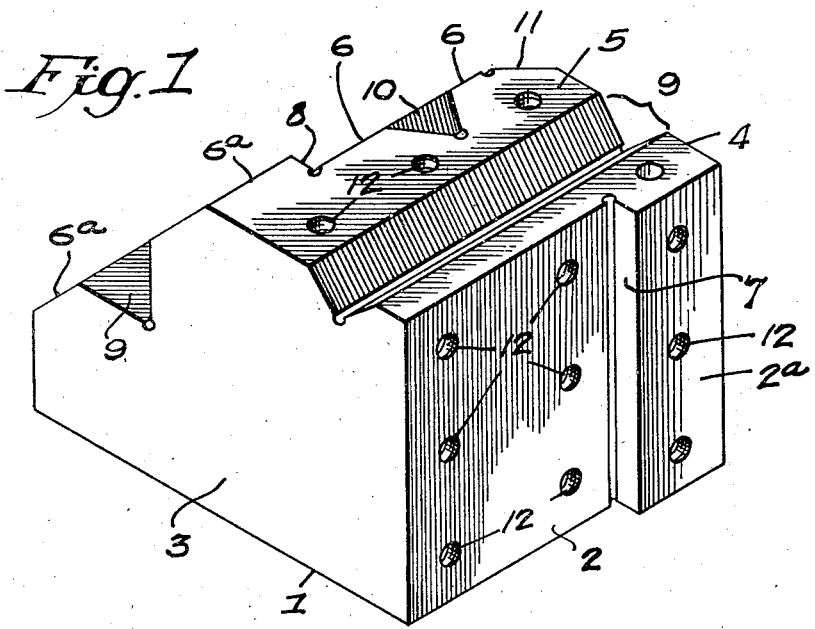
Figure 2:
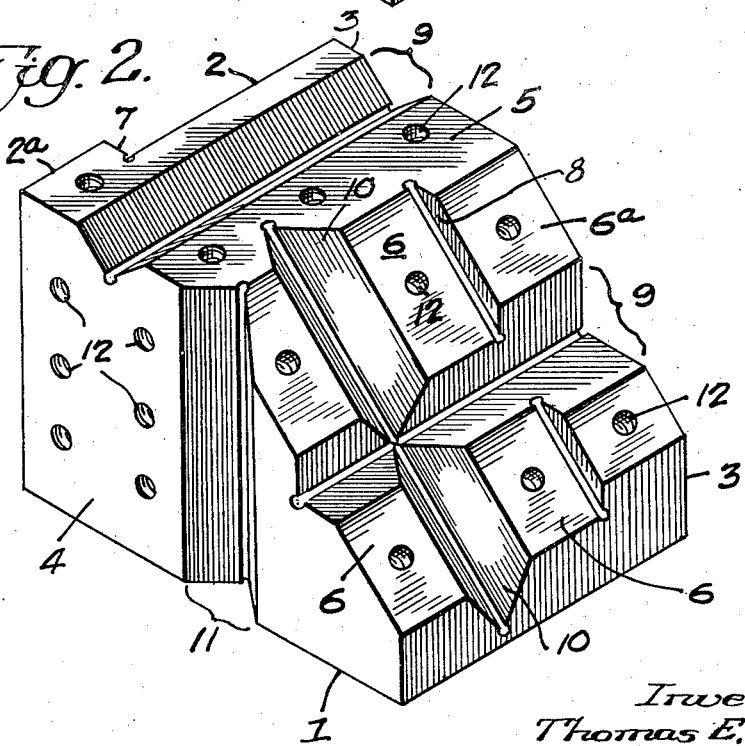
Figure 3:
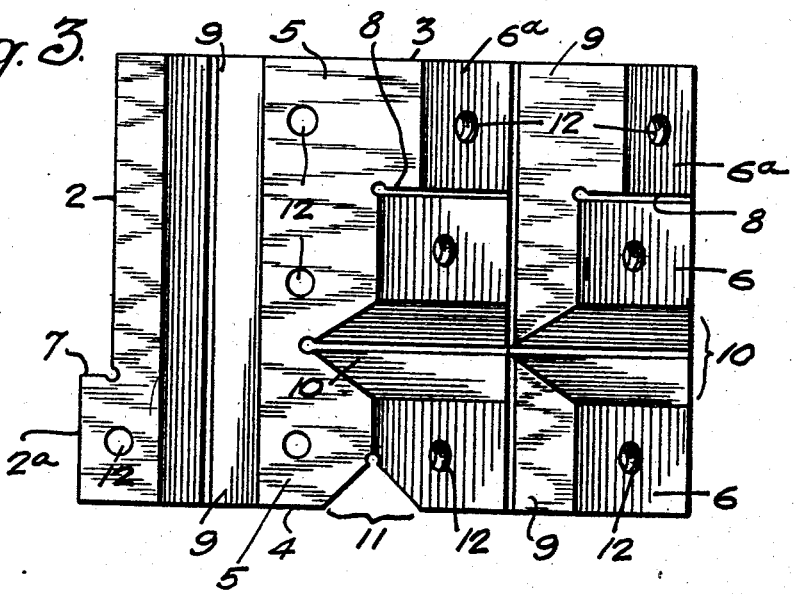
Figure 4:
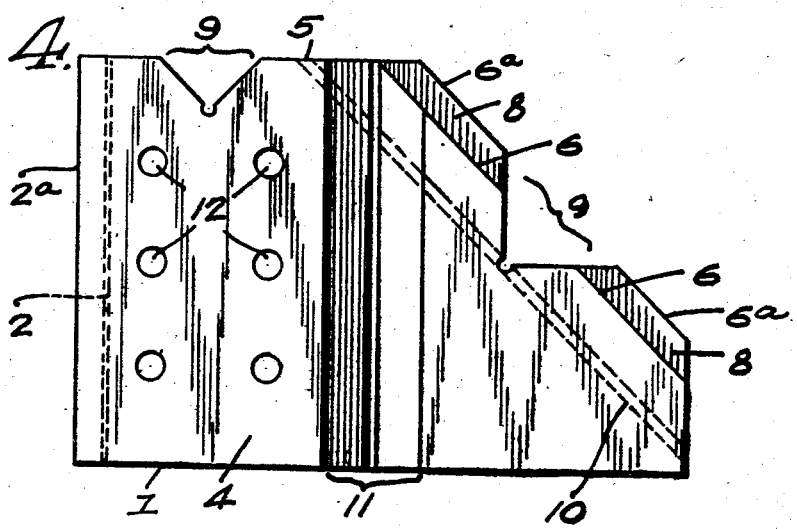

In the accompanying drawings:

Figs. 1 and 2 respectively are perspective views viewing the tool of the present invention from different angles;

Figs. 3 and 4 respectively are a plan view and an end elevation.

Figs. 5, 6, 7 and 8 are respectively a plan view, end, front and rear elevation of a modified form of the invention.

In the present instance the invention consists in providing a solid block of hard tempered steel having a true flat horizontal base surface 1; a true flat front vertical surface 2 at 90° to the base surface; a pair of true flat vertical end surfaces 3 and 4 truly parallel to each other and each disposed truly at 90° to the base surface 1 and at 90° to the vertical front surface 2; a top surface 5 which is truly parallel to the base surface 1; and a back surface 6 disposed at an angle of 45°, or at any other desired fixed angle, to the base surface 1.

The front surface 2 is provided with a true right-angular shoulder 7, perpendicular thereto, and an offset complementary front face 2a, which latter is truly parallel to the main front surface 2; and the back surface 6 is provided with a similar true right-angular perpendicular shoulder 8 and an offset complementary back surface 6a truly parallel to the main back surface 6, these shoulders being provided for positioning rectangular, flat and similar work pieces parallel to the end surfaces 3 and 4.

The top surface 5 and back surface 6 are each provided with a flat walled, V-shaped horizontal trough 9, parallel to the base 1, for holding round work pieces in true parallel relation to the base 1; the back surface 6 is provided with a similar flat walled V-shaped trough 10 intermediate and parallel to the end walls 3 and 4 and disposed at the same angle as the back surface 6 relative to the base surface 1 for holding round pieces accurately at the angle of the back surface 6 relative to the base 1; and the end surface 4 is provided with a vertical V-shaped trough 11 for accurately positioning round work pieces parallel to the end surface 4, with their axes truly perpendicular to the base 1.

Any desired number of tapped clamp screw holes 12 may be provided in the various surfaces for clamping the work pieces in position thereon.

In that form of the invention shown in Figs. 5, 6, 7 and 8, the block comprises a true flat horizontal base surface 101; a true flat front vertical surface 102; a pair of true flat end surfaces 103 and 104 respectively, truly parallel to each other and each disposed truly at 90° to the base surface 101 and at 90° to the vertical front surface 102; a true flat horizontal top surface 105 parallel to the base surface 101; and a back surface 106.

In this instance the back surface 106 is divided into two parts 106a, disposed at an angle of 45° for example to the base surface 101, and 106b, disposed at an angle of 60° for example to the base surface 101.

The front surface 102 is provided with one or a pair of right angular shoulders 107, perpendicular thereto, and one or two offset complementary faces 102a, each of which is truly parallel to the main front surface 102. The main front surface 102, in the present instance, is also provided with a vertical flat walled V-shaped trough 111 which is parallel to the end surfaces 103 and 104 respectively, and truly perpendicular to the base surface 101.

The top surface 105 is provided with a flat walled V-shaped horizontal trough 109, which is parallel to the base surface 101 and parallel to the front surface 102, and at true right angles to the end surfaces 103 and 104.

The back surface 106 is provided with a horizontal flat walled V-shaped trough 110, including a horizontal flat wall 110a, parallel to the base 101, and a vertical flat wall 110b, parallel to the front face 102, said flat walls 110a and 110b being at right angles to each other.

The back surface 106 is also provided with a central rib 108 affording a right-angular shoulder 108a, perpendicular to the 45° surface 106a, and a right-angular perpendicular shoulder 108b for the 60° back surface 106b.

The 45° rear surface 106a is provided with a flat walled V-shaped trough 112a parallel to and adjacent the end wall 104, and the 60° rear surface 106b is provided with a flat walled V-shaped trough 112b parallel to and adjacent the end wall 103.

It will be clear that, with the block resting on its flat base 101, the front face 102, with its perpendicular shoulders 107 and its trough 111, may be used to secure work pieces in true perpendicular relationship to the base 101, and that, by turning the block to the extent of 90° and using either of the end surfaces 103 or 104 as the base surface, the work pieces secured with the front face 102 could be turned a true 90° from the position they assumed while the block was resting on its true base 101.

In using the block with it setting on its base 101, work pieces clamped to the back surfaces 106a or 106b can be accurately machined at 45° or 60° to their respective longitudinal axis, assuming that the machine tool is operating in a horizontal plain parallel to the base 101. If the block is then turned 90°, to rest on its front surfaces 102 or 102a, 102a a work piece clamped to the surface 106b, or in the trough 112b, with the machine tool operating horizontally, would be machined at an angle of 30° to its longitudinal axis.

From the above, it will be clear that the block shown in Figs. 5 to 8 inclusive, is capable of holding work pieces accurately at 45°, 60°, 90° or parallel to the horizontal. Obviously the fixed angular surfaces 106a, 106b, may be trued to any desired angle, other than 45°, or 30°–60°, for special work if desired, but the 30-45-60-90 degree combination seems to be the most desirable for all-around toolmakers' and other machinists' work.

I claim:

1. An angle block provided with a true flat horizontal base surface, a true flat vertical front surface at 90° to said base surface, a top surface opposite said base surface, a true flat rear surface disposed at an angle of less than 90° with respect to said base surface and extending from said top surface substantially to said base surface, a right angle shoulder on and projecting vertically from said angular rear surface adjacent one side edge thereof, and a complementary rear angular surface parallel to the first said rear surface and extending laterally from said shoulder to said side edge.

2. An angle block provided with a true flat horizontal base surface, a true flat vertical front surface at 90° to said base surface, a top surface opposite said base surface, a true flat rear surface disposed at an angle of less than 90° with respect to said base surface and extending from said top surface substantially to said base surface, and a V-shaped flat walled trough extending horizontally across said rear surface parallel to said base surface intermediate said base surface and said top surface.

3. An angle block provided with a true flat horizontal base surface, a true flat vertical front surface at 90° to said base surface, a top surface opposite said base surface, a true flat rear surface disposed at an angle of less than 90° with respect to said base surface and extending from said top surface substantially to said base surface, and a V-shaped flat walled trough formed in said rear surface parallel to the angle thereof and extending substantially from said base surface to said top surface.

4. An angle block provided with a true flat horizontal base surface, a true flat vertical front surface at 90° to said base surface, a top surface opposite said base surface, a true flat rear surface disposed at an angle of less than 90° with respect to said base surface and extending from said top surface substantially to said base surface, a V-shaped flat walled trough extending horizontally across said rear surface parallel to said base surface intermediate said base surface and said top surface, and a V-shaped flat walled trough formed in said rear surface parallel to the angle thereof and extending substantially from said base surface to said top surface in intersecting relation to said horizontal trough.

5. An angle block provided with a true flat horizontal base surface, a true flat vertical front surface at 90° to said base surface, a top surface opposite said base surface, a pair of true flat parallel side surfaces each at 90° to said front surface at opposite sides respectively thereof, a true flat rear surface disposed at an angle of less than 90° with respect to said base surface and extending from said top surface substantially to said base surface, and a V-shaped flat walled trough formed in said rear surface parallel to the angle thereof and extending substantially from said base surface to said top surface intermediate and parallel to said side surfaces.

6. An angle block provided with true flat horizontal base and top surfaces spaced from and parallel to each other, a pair of true flat vertical side surfaces spaced apart and parallel to each other and extending from said base surface to said top surface, a true flat vertical front surface bounded by and disposed at 90° to each of said base top and side surfaces, a rear surface extending at an angle less than 90° with respect to said base surface substantially from said base surface to said top surface intermediate said side surfaces, a right angle shoulder formed on and projecting perpendicularly from at least one of said true flat surfaces and extending the full length of one dimension of the area thereof, a flat walled V-shaped trough formed in at least one of said true flat surfaces parallel to one of the marginal edges thereof as formed by the intersection of such trough-bearing flat surface with another of said flat surfaces, said rear flat surface bearing a pair of said troughs in right angular intersecting relation to each other.

7. An angle block provided with true flat horizontal base and top surfaces spaced from and parallel to each other, a pair of true flat vertical side surfaces spaced apart and parallel to each other and extending from said base surface to said top surface, a true flat vertical front surface bounded by and disposed at 90° to each of said base top and side surfaces, a rear surface extending at an angle less than 90° with respect to said base surface substantially from said base surface to said top surface intermediate said side surfaces, a right angle shoulder formed on and projecting perpendicularly from at least one of said true flat surfaces and extending the full length of one dimension of the area thereof, a flat walled V-shaped trough formed in at least one of said true flat surfaces parallel to one of the marginal edges thereof as formed by the intersection of such trough-bearing flat surface with another of said flat surfaces, said rear flat surface bearing a pair of said troughs in right angular intersecting relation to each other with one of said right angle perpendicular shoulders adjacent one of said side surfaces.

8. An angle block provided with true flat horizontal base and top surfaces spaced from and parallel to each other, a pair of true flat vertical side surfaces spaced apart and parallel to each other and extending from said base surface to said top surface, a true flat vertical front surface bounded by and disposed at 90° to each of said base top and side surfaces, a rear surface extending at an angle less than 90° with respect to said base surface substantially from said base surface to said top surface intermediate said side surfaces, a right angle shoulder formed on and projecting perpendicularly from at least one of said true flat surfaces and extending the full length of one dimension of the area thereof, a flat walled V-shaped trough formed in at least one of said true flat surfaces parallel to one of the marginal edges thereof as formed by the intersection of such trough-bearing flat surface with another of said flat surfaces, said rear flat surface bearing a pair of said troughs in right angular intersecting relation to each other, said top surface and one of said side surfaces each bearing one of said troughs parallel to said front surface.

9. An angle block provided with true flat horizontal base and top surfaces spaced from and parallel to each other, a pair of true flat vertical side surfaces spaced apart and parallel to each other and extending from said base surface to said top surface, a true flat vertical front surface bounded by and disposed at 90° to each of said base top and side surfaces, a rear surface extending at an angle less than 90° with respect to said base surface substantially from said base surface to said top surface intermediate said side surfaces, a right angle shoulder formed on and projecting perpendicularly from at least one of said true flat surfaces and extending the full length of one dimension of the area thereof, a flat walled V-shaped trough formed in at least one of said true flat surfaces parallel to one of the marginal edges thereof as formed by the intersection of such trough-bearing flat surface with another of said flat surfaces, said rear flat surface bearing a pair of said troughs in right angular intersecting relation to each other, said top surface and one of said side surfaces each bearing one of said troughs parallel to said front surface, said rear and front surfaces each being provided with one of said right angle perpendicular shoulders adjacent said side surfaces respectively.

THOMAS E. V. HUNT.